(12) United States Patent
Lo et al.

(10) Patent No.: US 6,851,065 B2
(45) Date of Patent: Feb. 1, 2005

(54) SYSTEM AND METHOD FOR EXECUTING RESUME TASKS DURING A SUSPEND ROUTINE

(75) Inventors: Yuan-Chang Lo, Austin, TX (US); Darrell Milburn Hunt, Pflugerville, TX (US); Gary Douglas Huber, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 666 days.

(21) Appl. No.: 09/950,029

(22) Filed: Sep. 10, 2001

(65) Prior Publication Data

US 2003/0051183 A1 Mar. 13, 2003

(51) Int. Cl.[7] .............................. G06F 9/00; G06F 9/445
(52) U.S. Cl. ............................. 713/300; 713/1; 713/2; 713/100
(58) Field of Search ................................ 713/1, 2, 100, 713/300

(56) References Cited

U.S. PATENT DOCUMENTS

| | | | |
|---|---|---|---|
| 5,502,814 A | | 3/1996 | Yuuki et al. |
| 5,513,359 A | | 4/1996 | Clark et al. |
| 5,978,913 A | * | 11/1999 | Broyles et al. ............... 713/2 |
| 6,434,697 B1 | * | 8/2002 | Leyda et al. ................. 713/2 |
| 6,557,108 B1 | * | 4/2003 | Moore et al. ............... 713/500 |
| 6,647,472 B2 | * | 11/2003 | Atkinson et al. ........... 711/158 |
| 6,732,280 B1 | * | 5/2004 | Cheok et al. ............... 713/300 |

FOREIGN PATENT DOCUMENTS

JP            6131082         5/1994

* cited by examiner

*Primary Examiner*—Dennie M. Butler
*Assistant Examiner*—Mark Connolly
(74) *Attorney, Agent, or Firm*—Baker Botts L.L.P.

(57) ABSTRACT

A method of operating a computer system with a central processing unit, a plurality of peripheral units coupled with the central processing unit, and a power management unit coupled with the central processing unit and the plurality of peripheral units for reducing power consumption during a stand-by mode, whereby a suspend routine is executed to transition from a normal operating mode into a stand-by mode and a resume routine is executed to transition back from a stand-by mode to a normal operating mode, moves specific moveable tasks from the resume routine path to the suspend routine path. Thus, recovery from a stand-by mode is performed much faster.

23 Claims, 3 Drawing Sheets

SYSTEM AND METHOD FOR EXECUTING RESUME TASKS DURING A SUSPEND ROUTINE

FIELD OF THE INVENTION

The present invention relates to a computer system, in particular a portable personal computer system with an improved suspend/resume function.

BACKGROUND OF THE INVENTION

Power management systems for personal computers, in particular for laptop computers are well known in the art. For example, a power management system within a laptop computer monitors the activity of the computer. In case no operations take place, for example no mouse activity and no keyboard activity is detected for a predefined period, a power management system starts a power reducing routine also known as a suspend routine. During the suspend routine a plurality of measurements are taken to save energy. For example, the processor clock speed is slowed down, the hard disk is spun down, not needed peripherals are shut down, a LCD display is turned off, etc. Different stages of low power modes are known. For example, different timings can be set for different devices within the laptop computer system. The display can be turned off after a first time period, whereas the hard disk is spun down after a longer second time period. Many varieties of these low power modes are known in the art. The final low power mode is usually a deep sleep mode in which most of the system components are either shut down completely or put in the lowest possible power consumption mode.

To re-activate a computer system some activity, such as pressing a key, moving a mouse, etc. by a user is necessary. The power management system then restarts the computer and puts the different system components into the same status they had before the suspend routine has been executed. This is called the resume routine. To be able to activate all necessary system components often significant time is necessary. These time periods add up and prevent a instant recovery of the system. Conventional methods of reducing the resume delays is to try to minimize how long each of the resume tasks will take, e.g. reducing the effect of hard disk spin up time by issuing the spin-up command as early as possible. However, the combined time used by the resume routine still adds up and causes significant delays for a user.

SUMMARY OF THE INVENTION

Therefore, a need for an improved power management system exists which overcomes the above mentioned problems. In one embodiment of the present invention a method of operating a computer system with a central processing unit, a plurality of peripheral units coupled with the central processing unit, and a power management unit coupled with the central processing unit and the plurality of peripheral units for reducing power consumption during a stand-by mode, whereby a suspend routine is executed to transition from a normal operating mode into a stand-by mode and a resume routine is executed to transition back from a stand-by mode to a normal operating mode, moves specific moveable tasks from the resume routine path to the suspend routine path. Thus, recovery from a stand-by mode is performed much faster.

A exemplary embodiment of the present invention is a method of operating a computer system and a computer system with:

a central processing unit;

a plurality of peripheral units coupled with the central processing unit;

a power management unit coupled with the central processing unit and the plurality of peripheral units for reducing power consumption during a stand-by mode, whereby a suspend routine is executed to transition from a normal operating mode into a stand-by mode and a resume routine is executed to transition back from a stand-by mode to a normal operating mode;

whereby the method comprises the steps of:

providing a plurality of tasks to be executed during a suspend routine to switch from a normal operating mode into a stand-by mode;

providing a plurality of tasks to be executed during a resume routine to switch from a stand-by mode back to a normal operating mode;

determining at least one task as being moveable from the resume routine;

executing the at least one task during the suspend routine.

At least one task can be within a normal operating system resume task which provides a LCD power cycling delay. Another normal basic input output system resume task provides a checking of the presence of a hard disk password. Yet another normal basic input output system resume task provides a start procedure for a Log-in client.

The method can further comprise the step of providing a preference selection routine in which the moveable tasks are automatically identified and moved from the resume routine path to the suspend routine path.

Moreover the method can comprise the step of providing a preference selection routine in which the moveable tasks can be manually identified and moved from the resume routine path to the suspend routine path.

Furthermore, a power management software comprises a suspend routine including a first plurality of tasks, a standby routine, and a resume routine including a second plurality of tasks, wherein the suspend routine includes at least one task from the resume routine. A third plurality of tasks within the resume routine can be executed either in the suspend routine or in the resume routine. this can be performed automatically or a user can selectively decide which task is operated in which task path.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
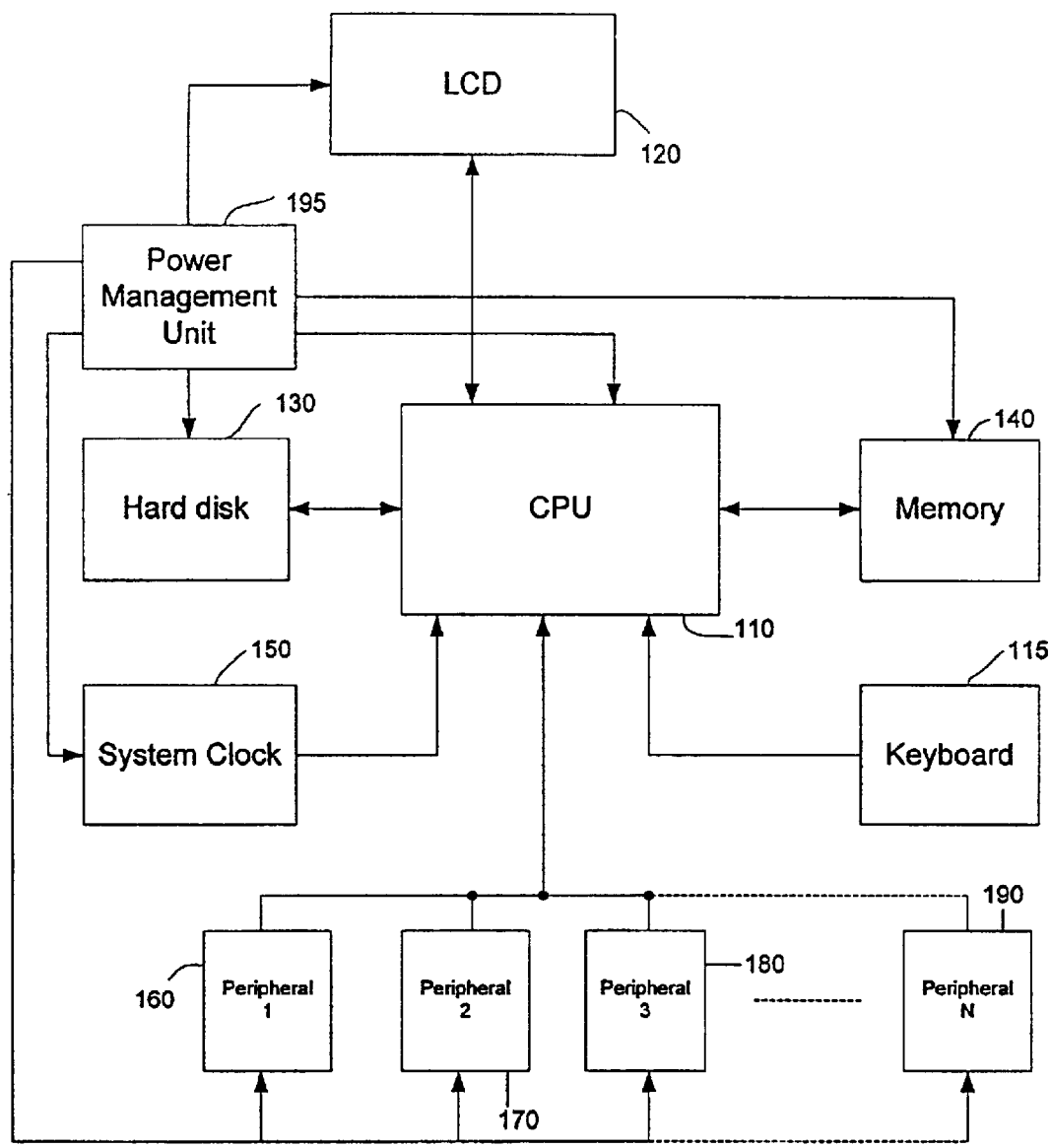
FIG. 1 is a block diagram of a personal computer system according to the present invention.

Turning to the drawings, exemplary embodiments of the present application will now be described. FIG. 1 shows a block diagram of a portable computer system 100, such as a laptop computer. The system 100 comprises a central processing unit 110 (CPU) as its central element. Connected to the CPU 110 are a keyboard 115, a liquid crystal display 120 (LCD), one or more hard disks 130, a memory system 140, a system clock unit 150 for providing a system clock, and a plurality of peripheral units 160, 170, 180, . . . 190. Furthermore, a power management unit 195 is provided which is coupled with all system components or at least with those system components whose power consumption is controllable. For providing clock signals to the CPU 110 and other system components a system clock generating unit 150 is provided. this unit 150 is also controllable by the power management unit 195.

During normal operation of the computer system 100 all system components are powered up and are fully operational. However, after a predetermined period of non-activity the power management unit deactivates certain system components in a predetermined way. A non-activity period can be detected by software means or by a combination of software and hardware, for example, a timer unit. The transition from a active state of normal operation to a stand-by state of low power consumption is called suspend routine. During this routine a plurality of tasks are performed in a predefined order to warrant proper system functionality. These tasks are software programs which control different devices such as the display system 120, different I/O peripherals 160 . . . 190, a mass storage system, such as a hard disk 130, a memory system 140, a system clock 150 generating unit, etc. Some of these peripherals provide their own power management unit and therefore do not need to be connected to the power management unit 195. Their mode is determined by command signals provided by the CPU 110. These peripherals or system components receive power management commands on a operating system level. Other components might have to be controlled on a lower level, such as the basic input output system (BIOS) level. Those components have to be controlled directly by the BIOS which provides specific routines to control the power management. For example, the CPU power consumption is mainly determined by the clock speed. The system clock is generated by system clock generating unit 150. Power management unit 195 controls system clock generating unit 150 and can switch to different clock signals for different type of applications. During a sleep mode, the system clock can be completely shut off. This task is usually done as the last task in a row of suspend tasks on a BIOS level.

Figure 2:
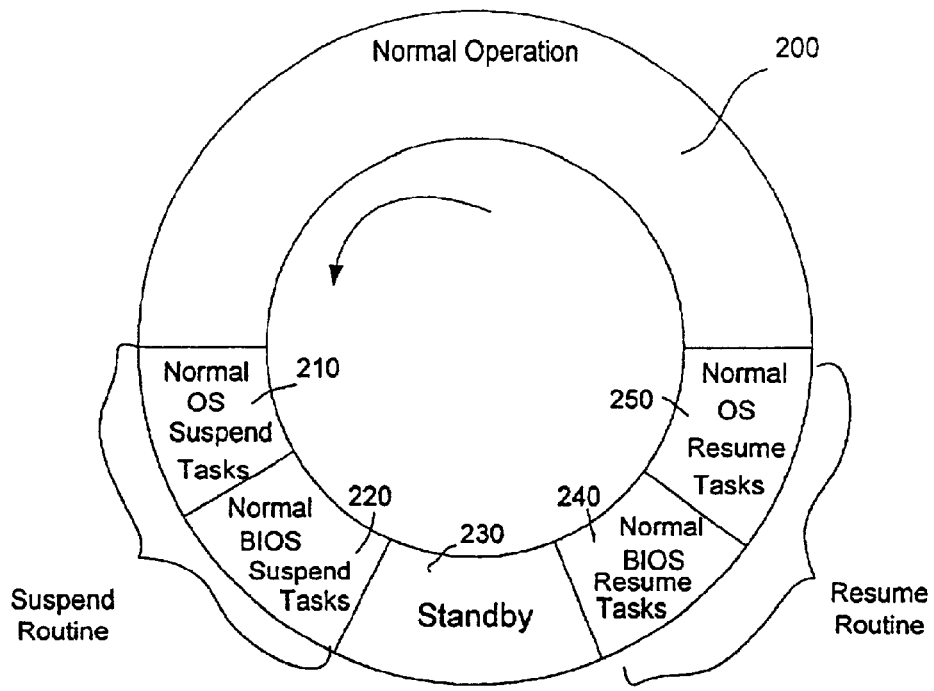
FIG. 2 is a diagram showing the transition from normal operation to standby and back according to the prior art.

FIG. 2 shows different states of the system. Normal operation mode is identified by numeral 200. From normal operation the system can be transitioned to a stand-by mode 230. To this end, a counter-clockwise step through the suspend routine path is necessary. The suspend routine consists of two major tasks, the normal operating system (OS) suspend tasks 210 and the normal basic input output system (BIOS) suspend tasks 220. The order of steps 210 and 220 is critical as tasks on a OS level have to be executed first. Once these tasks have been finished, tasks on a BIOS level can be executed. As explained above, on the OS level the different system components are communicating with the OS by means of hand-shaking protocols. Usually, many devices attached to the system are responsible for their own status. The suspend routine communicates to these devices that they are supposed to transit into a low power mode or to completely be turned off. On the BIOS level certain algorithms are performed to initiate a low power mode. For example, serial communication devices can be turned off or put into a stand-by state, the LCD display is turned off, the hard disk is spun down, the system clock can be switched to a lower frequency or can be completely shut off, other devices within the CPU 110 can be controlled to switch to their respective low power mode. Once all measurements for power reduction have been performed, then the system is in a stand-by mode 230.

To recover from this stand-by mode 230, a specific predefined event has to take place. For example, a key on the keyboard 115 has to be actuated, or a mouse has to be moved, or a mouse button has to be clicked, a signal from a serial port has to be received, a watchdog control signal has to be generated, etc. The keyboard 115 may provide special keys activating a suspend mode and/or for reactivating a system to prevent any accidentally actuation or any key actuated by a user might initiate a resume routine. Once the resume routine is initiated the reverse order of steps has to be performed as indicated in FIG. 2. Therefore, first the normal resume tasks on a BIOS level 240 will be performed followed by the normal OS resume tasks 250. ON the BIOS level the original system clock speed is reset again and other components are reactivated or put into normal operating condition. On the OS level, the hard disk is started, the LCD is turned on, etc. After completion of steps 240 and 250 the system is back to normal operation. However, some of the tasks are quite lengthy and prolongate the process of recovery. In particular, some of the tasks require a certain status of a device and the system has to wait until this status is reached to complete the respective task properly. One example of such a task is a task which has to load data from the hard disk. Such a task has to wait until the hard disk is turned on and operational. This can be a significant time delay. Other tasks might face similar delays. According to the exemplary embodiments of the present invention the recovery process can be shortened significantly as will be explained below.

Figure 3:
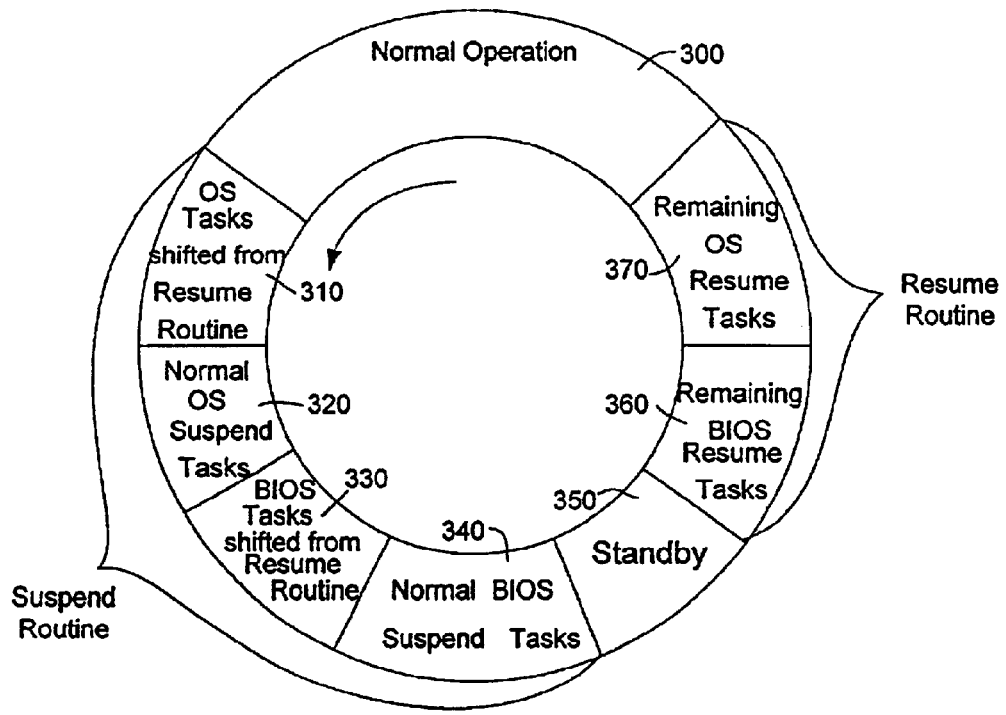
FIG. 3 is a diagram showing the transition from normal operation to standby and back according to an exemplary embodiment of the present invention.

FIG. 3 shows the transition from and to normal operation mode of a computer system having a low power mode as described above. To improve recover speed during the resume routine according to the present invention time consuming tasks that can be executed time independently from other resume tasks are identified and moved from the resume path to the suspend path. In other words, these tasks are executed before the system is put to sleep. This can be done as these tasks have to be executed but are not critical to the specific time they are executed and therefore do not necessarily have to be executed during the resume routine proper. It can be even more advantageous to do this because some of these time independent tasks can be executed faster with the system still being fully operational as will be explained below.

To improve the recover time during the resume routine each of the resume tasks has to be evaluated and it has to be checked whether they can be performed in the suspend path. By shifting the task loads from the resume path to the suspend path, the resume time will can be significantly reduced. This can also increase the suspend time, however, a user will more likely tolerate a longer suspend time in favor of shorter resume time.

For example, the following tasks have been identified as to be moved from resume path to suspend path:

LCD power cycling delay: A standard requirement for LCD displays is that there must be maintained a minimum time off for example, one second between turning the LCD off and on again. When a computer system is initiating the resume routine, this task will delay the routine by approximately one second to ensure that, for example, an immediate wake-up command after execution of a sleep command does not violate the above mentioned LCD specification. According to the present invention this tasks makes now sure that the LCD is off for a predetermined amount of time in the suspend path, before powering down the system. Thus, it is ensured that the LCD display was already off for the defined time period no matter when the reactivation of the system takes place.

Checking of hard disk password in the suspend path. This routine is not asking for the password and verifying it. Such a routine if present will and must be still executed in the resume path. This routine rather checks whether there is a password protection present, and if so, it does set a flag in memory. This way during the resume routine, BIOS will have to check only the flag in memory, and not have to wait for hard disk spin up to check for the presence of a password. If this task is executed during the suspend routine, the hard disk will be still fully operational at this time. Therefore, execution of this task during the suspend routine can be done very quickly and thus shortens the over all suspend/resume time.

Another task which can be shifted to the suspend routine is the "start the Log-in client" task (operating system user password entry panel). If executed during the suspend path, so that when the system resumes, the operating system does not have to load it from the disk drive which further shortens the recover time.

There could be other tasks, present and future, that can further reduce the resume time. With these improvements in addition to reducing or eliminating unnecessary tasks from resume path, systems with fast resume time can be provided.

Figure 4:
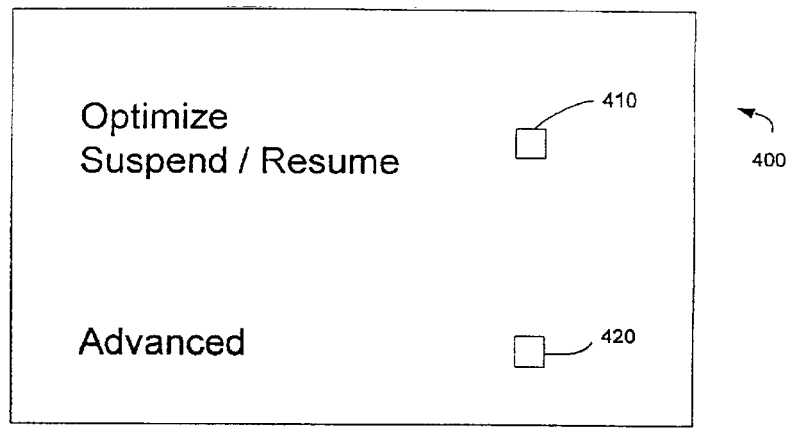
FIG. 4 shows a screen menu according to another exemplary embodiment of the present invention.
Figure 5:
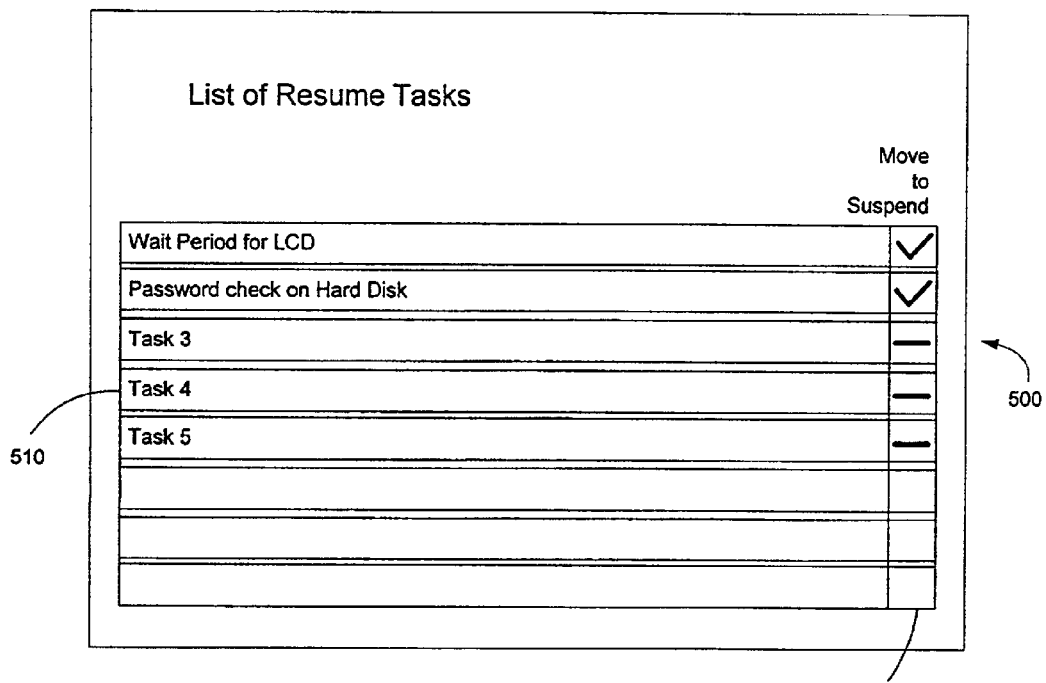
FIG. 5 shows a another screen menu according to the embodiment shown in FIG. 4.

Another exemplary embodiment of the present invention will be explained now in conjunction with FIGS. 4 and 5. To provide even more flexibility, the system can comprise optional parameters to be defined by a user. For example, FIG. 4 shows a dialog box 400 which will be displayed to a user after actuation of a preference function or setup program. This dialog box presents two buttons 410 and 420. Button 410 is used to generally optimize the suspend/ Resume functionality according to the method described above. If checked, the system automatically moves all tasks which are identified to be shiftable according to the above description from the resume path to the suspend path. If a user clicks on the second button 420, another dialog box will be opened as shown in FIG. 5. This dialog box 500 lists all resume tasks which can be moved to the suspend path. If a user specifically wishes that some tasks are to be executed during the resume path for whatever reasons, this can be predefined by the user by means of this dialog box 500. A table 510 shows all moveable tasks, for example, the wait period for the LCD, the password check on the Hard disk, or other tasks indicated in FIG. 5 by task3, task4, task5, etc. A second column 520 can be individually clicked for each line, respectively. A respective check mark indicates whether this task will be moved from the resume routine to the suspend routine. Thus, a user has complete control over the suspend/ resume functionality of the system.

The preferred embodiments show portable laptop computers. Suspend and Resume routines are usually performed by respective software. However, the present invention is not limited to laptop computers and can be as well applied to any kind of computer system comprising a power management unit and thus the ability to switch to a low power stand-by mode. Furthermore, there can be additional hardware provided which supports the respective software.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Method of operating a computer system with:

a central processing unit;

a plurality of peripheral units coupled with the central processing unit;

a power management unit coupled with the central processing unit and the plurality of peripheral units for reducing power consumption during a stand-by mode, whereby a suspend routine is executed to transition from a normal operating mode into a stand-by mode and a resume routine is executed to transition back from a stand-by mode to a normal operating mode;

said method comprising the steps of:

providing a plurality of tasks to be executed during a suspend routine to switch from a normal operating mode into a stand-by mode;

providing a plurality of tasks to be executed during a resume routine to switch from a stand-by mode back to a normal operating mode;

determining at least one task as being moveable from the resume routine;

executing the at least one task during the suspend routine.

2. Method according to claim 1, wherein said resume routine comprises normal operating system tasks and normal basic input output system tasks and wherein the at least one task is a normal operating system task.

3. Method according to claim 2, wherein said at least one task provides a LCD power cycling delay.

4. Method according to claim 1, wherein said resume routine comprises normal operating system tasks and normal basic input output system tasks and wherein the at least one task is a normal basic input output system task.

5. Method according to claim 4, wherein said at least one task provides a checking of the presence of a hard disk password.

6. Method according to claim 4, wherein said at least one task provides start procedure for a Log-in client.

7. Method according to claim 1, further comprising the step of providing a preference selection routine in which the moveable tasks are automatically identified and moved from the resume routine path to the suspend routine path.

8. Method according to claim 1, further comprising the step of providing a preference selection routine in which the moveable tasks can be manually identified and moved from the resume routine path to the suspend routine path.

9. Computer system with:

a central processing unit;

a plurality of peripheral units coupled with the central processing unit;

a power management unit coupled with the central processing unit and the plurality of peripheral units for reducing power consumption during a stand-by mode, whereby a suspend routine is executed to transition from a normal operating mode into a stand-by mode and a resume routine is executed to transition back from a stand-by mode to a normal operating mode;

means for executing a plurality of tasks during a suspend routine to switch from a normal operating mode into a stand-by mode;

means for executing a plurality of tasks during a resume routine to switch from a stand-by mode back to a normal operating mode;

determination means for determining at least one task as being moveable from the resume routine;

execution means for executing the at least one task during the suspend routine.

10. Computer system according to claim 9, wherein said resume routine comprises normal operating system tasks and normal basic input output system tasks and wherein the at least one task is a normal operating system task.

11. Computer system according to claim 10, wherein said at least one task provides a LCD power cycling delay.

12. Computer system according to claim 9, wherein said resume routine comprises normal operating system tasks and normal basic input output system tasks and wherein the at least one task is a normal basic input output system task.

13. Computer system according to claim 12, wherein said at least one task provides a checking of the presence of a hard disk password.

14. Computer system according to claim 12, wherein said at least one task provides start procedure for a Log-in client.

15. Computer system according to claim 9, further comprising the step of providing a preference selection routine in which the moveable tasks are automatically identified and moved from the resume routine path to the suspend routine path.

16. Computer system according to claim 9, further comprising the step of providing a preference selection routine in which the moveable tasks can be manually identified and moved from the resume routine path to the suspend routine path.

17. Computer system according to claim 9, wherein said computer system is a laptop computer.

18. Power management software executed in a central processing unit of a computer system comprising a suspend routine including a first plurality of tasks, a standby routine, and a resume routine including a second plurality of tasks, wherein the suspend routine includes at least one task from the resume routine.

19. Power management software according to claim 18, wherein a third plurality of tasks within the resume routine can be executed either in the suspend routine or in the resume routine.

20. Power management software according to claim 19, wherein each task of the third plurality of tasks can be marked to be either executed in the resume routine or in the suspend routine.

21. Power management software according to claim 19, wherein the third plurality of tasks is automatically executed in the suspend routine.

22. Power management software according to claim 18, wherein the central processing unit is completely turned off during the stand-by mode.

23. Power management software according to claim 18, wherein the suspend routine and the resume routine comprise tasks executed on a operating system level and on a basic input output system level.

* * * * *